United States Patent Office 2,987,662
Patented June 6, 1961

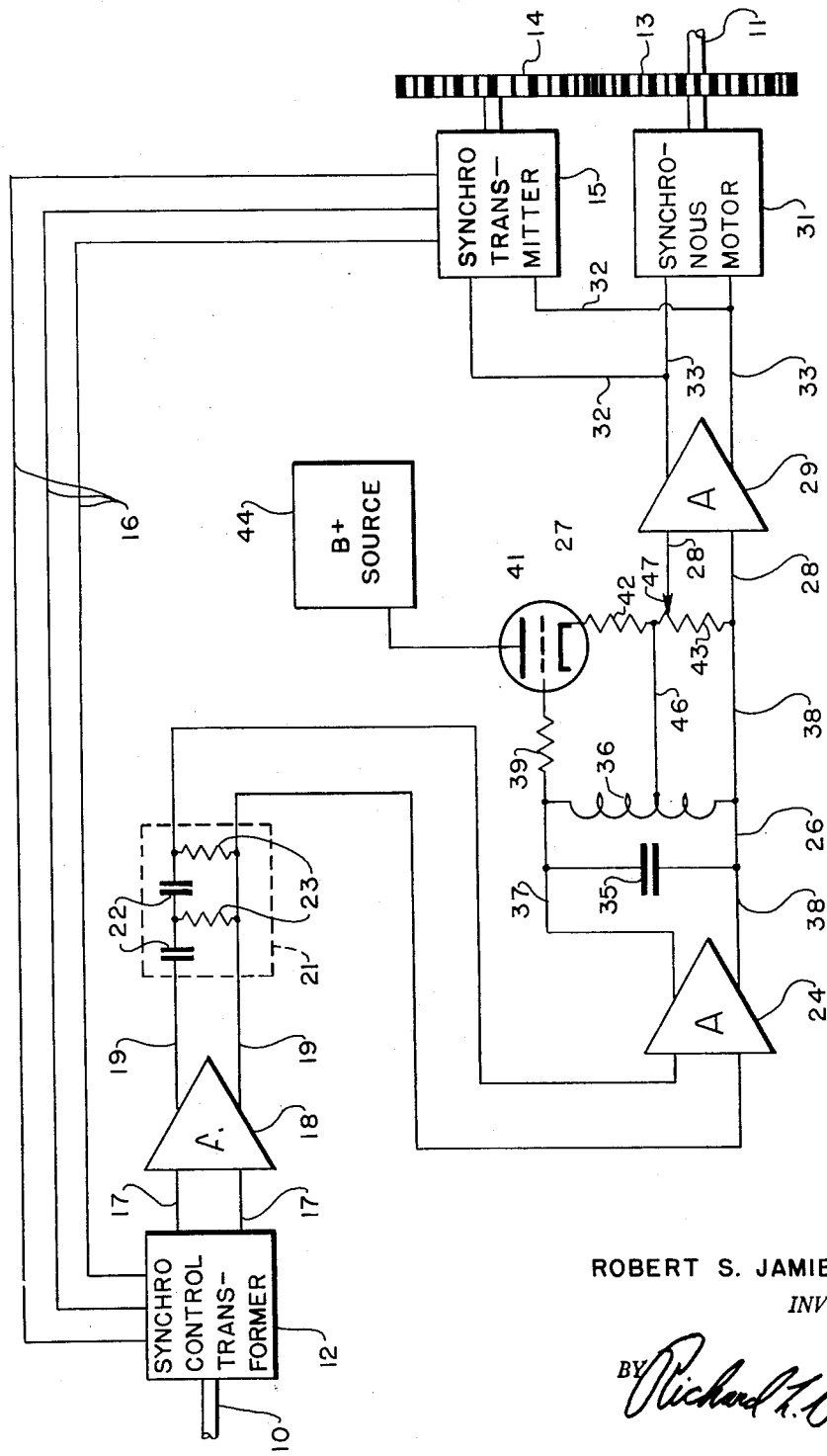
ROBERT S. JAMIESON
*INVENTOR.*

2,987,662
SPEED COMPARING AND CONTROLLING SERVOSYSTEM

Robert S. Jamieson, 169 E. 19th St., Costa Mesa, Calif.
Filed Dec. 9, 1958, Ser. No. 779,233
15 Claims. (Cl. 318—329)

This invention relates to a servomechanism embodying frequency modulation principles. More particularly, the invention relates to a servomechanism system and method in which both amplitude modulation and frequency modulation are employed.

Prior-art speed control systems, such as may be employed for synchronizing two or more shafts, are deficient in a number of ways some of which will now be mentioned. In D.C. systems, shaft speeds are controlled but the relative shaft positions are not controlled once synchronism is achieved. Another defect of D.C. systems is that it is difficult to control the position of the drive motor because a D.C. motor will accelerate much more rapidly than it will decelerate. Attempts to correct the last-mentioned defect of D.C. systems have involved the use of dynamic braking and reversed excitation, but these necessitate complex switching operations. Other defects of D.C. systems include their susceptibility to drift in the amplifiers, such drift producing a voltage which appears as a false error signal. Furthermore, extraneous signals induced in the wiring may be converted to D.C. and cause improper behavior of the system.

With relation to prior-art A.C. systems, acceleration is also much greater than deceleration and produces the above-mentioned defects and instabilities. Stray voltages induced into the wiring are amplified and applied to the motor along with the error signal, thereby producing undesired torques. Furthermore, A.C. systems conventionally require a signal excitation source having a pure wave form or else the harmonics produce torques which become excessive, relative to the torques produced by the fundamental, as the voltage is varied in the neighborhood of balance. In addition, the wiring capacitance of such systems causes a residual unbalance of the bridge conventionally employed, making it very difficult or impossible to achieve balance.

In view of the above and other factors relative to prior-art servomechanism systems and methods, it is an object of the present invention to provide a servomechanism system and method involving frequency modulation principles, so that the motor may be of the synchronous type having a speed which depends upon the frequency of the fundamental and is independent of the harmonics.

A further object is to provide a servomechanism system and method in which stray voltages do not affect motor speed, and in which adjustments in speed and relative shaft positions may be made with great precision and without difficulty.

A further object is to provide a servomechanism system and method in which relative shaft speeds and positions may be very accurately controlled, and in which acceleration and deceleration of the motor are relatively equal so that hunting and oscillations are reduced.

These and other objects and advantages of the invention will be set forth more fully in the following specification and claims, which relate to the attached single-figure drawing comprising a schematic diagram of one form of the invention.

Referring to the drawing, there is illustrated a servomechanism system in which it is desired to determine both the speed and position, under control of an input shaft 10, of an output shaft 11. It is to be understood, however, that the input shaft may be replaced by an electrical signal, such as from a computer. Also, in accordance with conventional principles, it is to be understood that the output shaft may be something other than a rotating element, for example a piston. The velocity, acceleration, position, etc., of input shaft 10 comprises the input information, or command signal, which is to be followed by the output shaft 11 (the controlled variable).

Input shaft 10 is connected to a shaft position transducer 12, whereas output shaft 11 is connected by means of gears 13 and 14 to a second shaft position transducer 15. Although the term "shaft position" is employed in connection with transducers 12 and 15, it is to be understood that such factors as acceleration, speed, electric signal frequency, etc., are involved. Transducers 12 and 15 may be potentiometers, variable capacitors, etc., but are illustrated as synchros. More specifically, synchro 12 may be a conventional synchro control transformer which measures the instantaneous position of shaft 10 continuously and converts this position to a proportional electrical signal. Synchro 15 may be a synchro transmitter (synchro generator) which converts the instantaneous position of shaft 11 to electrical signals which are transmitted through conductors 16 to the synchro control transformer 12. The signals received through conductors 16 are the excitation voltages for control transformer 12, such signals being amplitude modulated by the transmitter 15 in accordance with the position of its associated output shaft 11.

The above-described arrangement results in generation of an output signal fed from control transformer 12 to leads 17. Such signal, conventionally termed the error signal, is a function of the difference between the position of input shaft 10 and that of output shaft 11. The error signal is either in-phase with the excitation voltage to synchro transmitter 15, or is 180 electrical degrees out-of-phase therefrom, depending upon the manner of connection of conductors or leads 16. Such leads or conductors 16 are so connected, in conventional manner, that when input shaft 10 is further clockwise than output shaft 11, the error signal in leads 17 is in-phase with the excitation voltage to transmitter 15; and when shaft 10 is further counterclockwise than shaft 11, the error signal is 180 electrical degrees out-of-phase with the excitation voltage to transmitter 15. Throughout this specification it will be assumed, for purposes of simplicity, that the direction of shaft rotation is clockwise.

The error signal in leads 17 is fed into a conventional amplifier 18 where it is amplified to a desired amplitude level. The amplified signal is fed through leads 19 to a phase-shifting circuit 21 which may be of any desired type but is illustrated to comprise two series-connected capacitors 22 in one of the leads 19, and two resistors 23 bridged or shunted between the leads 19 on opposite sides of the output capacitor 22.

The output of the phase-shifting circuit is fed into another amplifier 24 in order that the signal may be raised to the desired level of voltage and power. The amplifier output is fed into the the resonant circuit (tank circuit, or frequency-determining means or network) 26 of a variable-frequency oscillator 27 which is illustrated as being of the grounded-plate Hartley type. The oscillator output is connected through leads 28, and a suitable amplifier 29, to the drive motor 31 which is preferably of the hysteresis synchronous type. The shaft of motor 31 is the output shaft 11 previously described. Leads 32 are connected between the input to motor 31 and the synchro transmitter 15. Stated more definitely, leads 32 extend between the input to synchro transmitter 15 and leads 33 which connect the output of amplifier 29 to motor 31.

Proceeding to a detailed description of the oscillator 27 and its resonant circuit 26, this comprises a capacitor 35 and an inductor 36 connected in parallel with each other between the leads 37 and 38 from amplifier 24.

Lead 37 is connected through a current-limiting resistor 39 to the grid of a triode vacuum tube 41, whereas lead 38 is connected to the output lead 28 previously indicated. The cathode of the triode 41 is connected through two series-connected resistors 42 and 43 to lead 38, whereas the plate of the vacuum tube is connected to a suitable B+ voltage source indicated schematically at 44. A lead 46 is connected between the junction of resistors 42 and 43 and a tap on inductor 36. One of the output leads 28 to amplifier 29 comprises a sliding tap 47 on resistor 43, which functions as a potentiometer.

In the operation of the oscillator 27 and its frequency-determining means or resonant circuit 26, the cathode of tube 41 furnishes power of essentially sinusoidal wave shape to the resonant circuit. The value of resistor 42 is so adjusted that oscillations will be maintained at a predetermined frequency which depends largely upon the values of capacitor 35 and inductor 36. The oscillation frequency is approximately the same as the resonant frequency of circuit 26, that is to say the frequency at which the inductive and capacitive currents are equal and are 180 degrees out-of-phase with each other. However, this occurs only at the normal or center frequency of the oscillator, and not when the oscillator frequency is modified by the signal delivered from amplifier 24 to the frequency-determining network 26.

According to the invention, the circuit elements between synchro control transformer 12 and the frequency-determining means 26 are so adjusted and constructed that the current injected into the network 26 will be approximately 90 degrees out-of-phase, or in quadrature, with the voltage across such network 26. Stated otherwise, the elements on the input side of the resonant circuit 26 (between circuit 26 and transformer 12) are caused to appear reactive in nature, and to function selectively as an inductor or a capacitor in parallel with the resonant network 26. Since the resonant frequency depends upon the inverse square root of the product of circuit capacitance and inductance, it will be understood that such equivalent capacitance or inductance in parallel with the capacitor 35 and inductor 36 will vary the frequency of oscillation. The current fed into the resonant network 26 is not only in substantial quadrature relative to the voltage across such circuit but it is proportional to the error, as previously indicated. Since the oscillator frequency is thus varied, it follows that the speed of synchronous motor 31 will be likewise varied.

In order to achieve the above-mentioned phase relationship, the phase-shifting circuit 21 should be of a type adapted to shift the phase ninety electrical degrees at the normal or center frequency of oscillator 27. Such phase shift may be either lagging or leading, that is to say that the output signal may be either delayed ninety degrees behind the input signal or advanced ninety degrees ahead of the input signal. The choice of the particular relationship is governed by the remainder of the circuit design, taking into account the phase reversals in the amplifiers 18 and 24. It is to be understood that conventional amplifiers shift the phase either zero or 180 electrical degrees per stage, in the middle of the pass band. The phase shift in the amplifiers may be varied by adjusting the coupling between the stages. This may be done in such a way as to eliminate the necessity for the separate phase-shifting circuit 21.

The circuit connections, direction of phase shift, etc., are so correlated that when output shaft 11 lags behind (becomes less clockwise than) input shaft 10, the current injected into resonant circuit 26 from amplifier 24 leads the voltage across circuit 26. Conversely, when shaft 11 becomes ahead of (more clockwise than) shaft 10, the current fed into circuit 26 from amplifier 24 lags the voltage across circuit 26. Stated otherwise, the circuit connections, phase shift, etc., are so correlated to the shafts that the latter tend to run as if they were a single shaft instead of two separate ones.

It is pointed out that the circuit comprising leads 17, amplifier 18, leads 19, phase-shifter 21, amplifier 24, oscillator 27 and its frequency-determining network 26, leads 28, amplifier 29, leads 33 and synchronous motor 31 are conventionally referred to as the "forward" circuit of the servomechanism. The circuit comprising leads 32, synchro transmitter 15 and leads 16 are conventionally referred to as the "feedback" circuit of the servo, and complete the closed loop or circuit.

Operation

Stated generally, the input or command information is illustrated as the speed and position of input shaft 10, whereas the controlled variable is the speed and position of output shaft 11. The feedback signal is transmitted from synchro transmitter 15 through leads 16 and is compared in transformer 12 with the input information. Any error in instantaneous position of shaft 11 relative to shaft 10 appears in leads 17 as an analogous error signal in electrical form. Such error signal is amplified, shifted in phase through 90 degrees, and impressed across the frequency-determining network 26 to vary the frequency of the oscillator 27. Since the speed of operation of synchronous motor 31 depends upon the oscillator frequency, the motor will speed up or slow down as is required to place shaft 11 in synchronism with shaft 10 and in proper angular relationship relative thereto.

Let it first be assumed that the shafts 10 and 11 are rotating in perfect synchronism with each other and are at the same instantaneous angular positions. There will then be no error signal, and the oscillator 27 will be operating at its normal or center frequency. This frequency will determine the speed of operation of motor 31.

Let it next be assumed that output shaft 11 lags behind (becomes less clockwise than) input shaft 10. This will result, as stated above, in creation of an error signal the amplitude of which will depend upon the angle of lag. Stated more definitely, the amplitude of the error signal is proportional to the difference of the sines of the two angles. The phase of the error signal is such that the current injected into the resonant circuit 26 from amplifier 24 will lead the voltage across circuit 26. This will appear to the oscillator 27 as if the total capacitance has been reduced, which will have the effect of raising the frequency of oscillation. This will cause motor 31 to accelerate until shaft 11 has reached the same angular position as shaft 10, at which time the error signal ceases to exist. It is pointed out that the magnitude of the error signal decreases progressively as perfect synchronism is approached, which has the effect of reducing or eliminating hunting.

Let it next be assumed that output shaft 11 moves ahead of (becomes more clockwise than) the input shaft 10. The resulting error signal in leads 17 will again be proportional to the error angle, but its phase will be 180 degrees opposite from the phase of the error signal when shaft 11 lags behind the shaft 10. Accordingly, the current injected from amplifier 24 into resonant circuit 26 will lag behind the resonant circuit voltage by approximately 90 degrees, causing the oscillator to generate a lower frequency signal so that motor 31 decelerates until shaft 11 is again in synchronism with shaft 10. Stated otherwise, it appears to the oscillator that capacitance has been added, causing a decrease in oscillator frequency.

To amplify upon the above theory, it is pointed out that when the amplifier furnishes additional leading current to the tank 26, the tube 41 needs to furnish less leading current thereto. Thus, it appears to the oscillator that total capacitance has been reduced, making oscillator frequency increase until both capacitive currents equal the inductive current. This is the same as adding an inductor in shunt with elements 35—36. When the amplifier furnishes more lagging current to the tank 26, the effect is the same as if capacitance has been added in shunt.

It is pointed out that the same type of control may be achieved by causing the amplifier 24 to draw leading or lagging current from the resonant circuit 26, instead of feeding it thereto. The action is then reversed, since the drawing of a leading current from the resonant circuit 26 appears as an additional capacitance, and causes the oscillator frequency to decrease.

It is to be understood that conventional phase-shifting network produces a shift of exactly ninety degrees at only one frequency. In the present circuit, the parameters are chosen to produce the ninety degree phase shift at the normal or center frequency of the oscillator, when no error signal exists. As the oscillator frequency departs from the center frequency, the phase shift deviates from ninety degrees. However, the signal at the input to the resonant circuit 26 may be considered as being composed of two components, one in phase and one ninety degrees out-of-phase. Only the component which is in quadrature will affect the oscillator frequency, it being understood that the in-phase component will appear as a positive or negative resistance in parallel with the resonant circuit. This resistive component appears as an additional loss if positive, or aids in overcoming losses if negative. Thus, the amplitude of the oscillator output will tend to rise or fall, but this may be overcome by inclusion of conventional amplitude-controlling circuits. The described reactive components provide useful control over a wide range of frequencies, frequency changes of plus or minus 25% having been obtained in the present manner.

It is pointed out that the speed of the synchronous motor 31 depends upon the frequency of the fundamental delivered from oscillator 27, being independent of harmonics, changes in voltage, stray or induced voltages, etc. Thus, the servo produces speed adjustments without difficulty, and with precision previously unobtainable.

When it is desired to decelerate the motor, the oscillator frequency is reduced. The motor is then operating in super synchronism, a condition under which a torque is generated which opposes the rotation of the motor. There are accordingly two torques available to decelerate the motor, namely generated torque and friction torque. The motor therefore decelerates more rapidly than motors in conventional amplitude-controlled systems, making acceleration and deceleration more nearly equal than in conventional systems. It follows that the operation of the present system is much smoother, and that oscillations or hunting are reduced.

The synchro control transformer 12 may be of the type described on page 34, and following, of "Servomechanism Fundamentals" by Henri Lauer, Robert Lesnick and Leslie E. Matson, published by McGraw-Hill Book Company, Inc., in 1947. A suitable synchro transmitter, otherwise known as a synchro generator, is described on page 27 and following of the same book. It is to be understood that the leads 16 connect the stators of the elements 12 and 15 in proper phase relationship, and that the leads 17 and 32 are connected, respectively, to the rotors of elements 12 and 15.

Various embodiments of the present invention, in addition to what has been illustrated and described in detail, may be employed without departing from the scope of the accompanying claims.

I claim:

1. A servomechanism system, comprising an input means, an output means which it is desired to control in response to a characteristic of said input means, electric motor means to govern said output means in response to the frequency of electric power supplied to said motor means, electric circuit means forming a forward path between said input means and said motor means, electric circuit means forming a feedback path from said output means, and a variable-frequency source connected in at least one of said forward and feedback paths.

2. The invention as claimed in claim 1, in which said electric motor means is a hysteresis synchronous motor.

3. The invention as claimed in claim 1, in which said source is an oscillator connected in said forward path.

4. A servomechanism, which comprises an output element, an electric motor operatively associated with said output element and adapted to vary in speed in response to the frequency of electric power supplied thereto, means to generate a signal which is a function of a characteristic of said output element, means to generate an error signal which varies in response to the difference between the amplitudes of said first-mentioned signal and an input or command signal, an oscillator having a frequency-determining means, means to connect said oscillator to said electric motor, and means to supply said error signal to said frequency-determining means to thereby vary the frequency of the power delivered from said oscillator to said electric motor in accordance with the magnitude of said error signal.

5. In a servomechanism, a variable-frequency oscillator adapted to control the speed of an output means, and means to deviate the frequency of said oscillator from rest or center freqency in response to an error signal determined by comparing a characteristic of said output means with input information, said deviation means incorporating means to supply an alternating error current to the frequency-determining means of said oscillator in such phase relationship that said current has a major component in quadrature to the voltage across said frequency-determining means.

6. The invention as claimed in claim 5, in which said deviation means comprises means to cause said error current to alternately lag or lead the voltage across said frequency-determining means in response to the direction of deviation of said characteristic of said output means relative to said input information.

7. A servomechanism system adapted to correlate the positions of an output member and an input member, which comprises a first position transducer associated with said input member, a second position transducer associated with said output member, an electric motor adapted to drive said output member, feedback circuit means connected between said first and second position transducers, said position transducers and feedback circuit means operating to effect generation of an error signal in response to deviation of said output member from said input member, and forward circuit means to control said electric motor in response to said error signal, said forward circuit means including a variable-frequency oscillator and means to alter the frequency of said oscillator in response to said error signal.

8. A servomechanism system adapted to correlate the positions of an output member and an input member, which comprises a first position transducer associated with said input member, a second position transducer associated with said output member, a synchronous motor adapted to drive said output member, feedback circuit means connected between said first and second position transducers, said position transducers and feedback circuit means operating to effect generation of an error signal in response to deviation of said output member from said input member, a variable frequency oscillator having a frequency-determining network, means to feed said error signal to said frequency-determining network to alter the frequency of said oscillator in response to the magnitude of said error signal, and means to feed the output from said oscillator to said synchronous motor to thereby control the speed thereof.

9. A servomechanism system adapted to correlate the speeds and positions of an output member and an input member, which comprises a first position transducer associated with said input member, a second position transducer associated with said output member, a synchronous motor adapted to drive said output member, feedback circuit means connected between said first and second position transducers, said position transducers and feedback circuit means operating to effect generation of an alternating error signal in response to deviation of said output member from said input member, a variable-frequency oscillator having a resonant circuit, means to feed said error signal to said resonant circuit in such phase relationship that the current fed to said resonant circuit is substantially 90 degrees out-of-phase with the voltage across said resonant circuit at the center or rest frequency of said oscillator, and means to feed the output from said oscillator to said synchronous motor to determine the frequency thereof.

10. The invention as claimed in claim 9, in which said means to feed said error signal to said resonant circuit includes amplifier means and phase-shifter means adapted to shift the phase of the error current through substantially 90 degrees.

11. The invention as claimed in claim 9, in which said first position transducer is a synchro control transformer, and said second position transducer is a synchro transmitter.

12. The invention as claimed in claim 9, in which said position transducers and said circuit means are adapted to feed a leading current to said resonant circuit when said output member is deviated in one direction from said input member, and a lagging current to said resonant circuit when said output member is deviated in the other direction from said input member.

13. A servomechanism, comprising input and output members, first and second position transducers associated, respectively, with said input and output members, an electric motor adapted to drive said output member, said electric motor being of a type the speed of which is responsive to the frequency of electric power fed thereto, a variable-frequency oscillator having a frequency-determining network, means to connect the output of said oscillator to said motor to thereby vary the speed of said motor in response to the frequency of said oscillator, and circuit means including said position transducers to feed to said frequency-determining network a current which is a function of the deviation between said input and said output members and which selectively leads or lags the voltage across said frequency-determining network in accordance with the direction of deviation of said output member from said input member.

14. The invention as claimed in claim 13, in which said motor is a synchronous motor, and said frequency-determining network is a resonant circuit.

15. A servomechanism, which comprises an output element, an electric motor operatively associated with said output element and adapted to vary in speed in response to the frequency of electric power supplied thereto, means to generate a signal which is a function of a characteristic of said output element, means to generate an error signal which varies in response to the difference between said first-mentioned signal and an input or command signal, an oscillator having a frequency-determining means, means to connect said oscillator to said electric motor, and means to supply said error signal to said frequency-determining means to thereby vary the frequency of the power delivered from said oscillator to said electric motor in accordance with the magnitude of said error signal, said means to supply said error signal to said frequency-determining means including means to shift the phase of said error signal through approximately 90 electrical degrees at the normal or center frequency of said oscillator.

References Cited in the file of this patent

UNITED STATES PATENTS

| | | |
|---|---|---|
| 2,476,496 | Klieser | July 19, 1949 |
| 2,501,583 | Shafer | Mar. 21, 1950 |
| 2,812,928 | Mesh et al. | Nov. 12, 1957 |

FOREIGN PATENTS

| | | |
|---|---|---|
| 880,317 | Germany | June 22, 1953 |

OTHER REFERENCES

Electronic Instruments, Greenwood Holdam, Macrae, McGraw-Hill, New York, 1948, pp. 485–88.

Servomechanism Practice, Ahrendt, W. R., McGraw-Hill, New York, 1954, p. 115.

Cage, J. M., and Bashe, C. J., "Theory and Application of Industrial Electronics," First Ed., page 91, McGraw-Hill, New York, 1951.

Termon, Frederick E.: "Electronic and Radio Engineering," Fourth Ed., page 601, McGraw-Hill, 1955.

Servomechanism Fundamentals, Lauer, Lesnick, Matson, McGraw-Hill, New York, 1947, pp. 37, 38.